Jan. 17, 1933.  L. J. TOWNE  1,894,603
DOUBLE CHECK VALVE
Filed Feb. 24, 1930
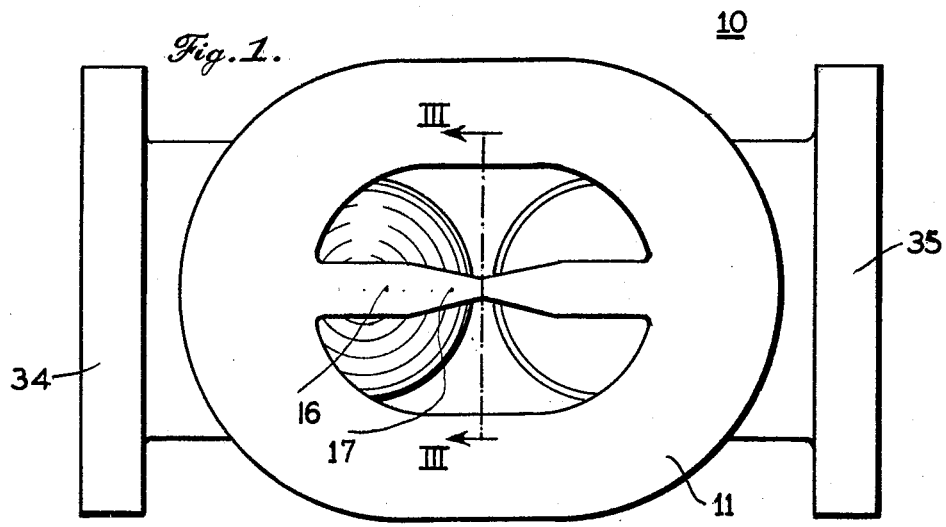
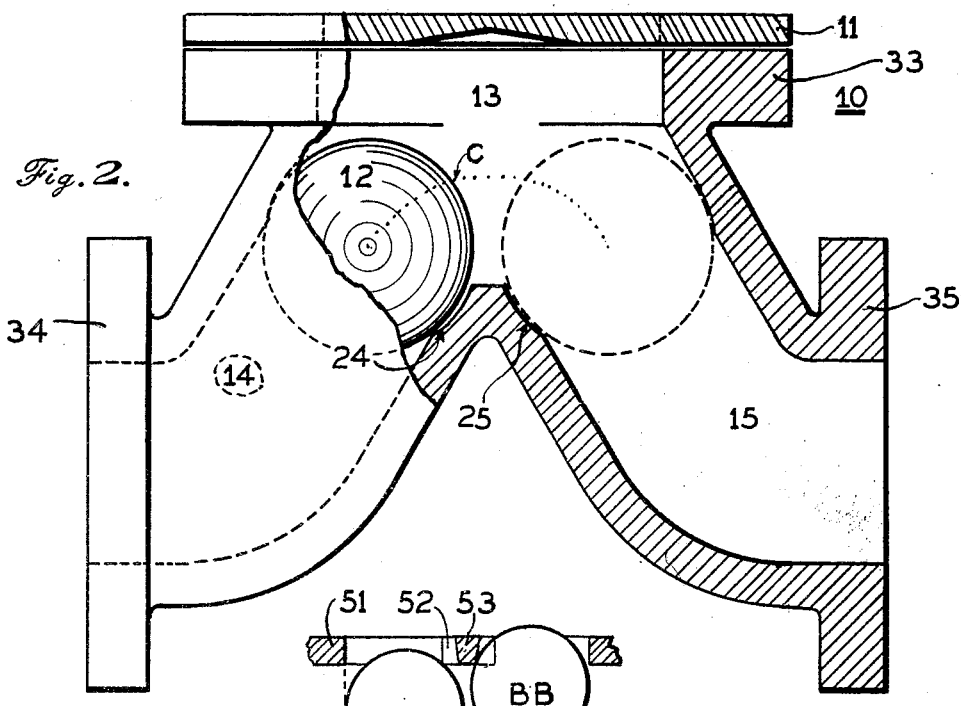
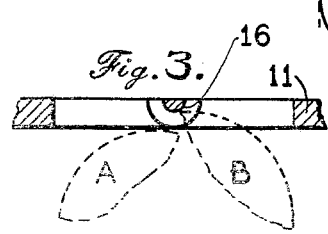
Inventor
L. J. TOWNE.
By
Tom G. Boman.
Attorney Patented Jan. 17, 1933

1,894,603

UNITED STATES PATENT OFFICE

LELAND J. TOWNE, OF OKLAHOMA CITY, OKLAHOMA

DOUBLE CHECK VALVE

Application filed February 24, 1930. Serial No. 430,592.

My invention pertains to valves and more particularly to a double check valve.

Most valves of this character require manual operation and are somewhat complicated. It is my aim to provide an automatic double check valve which is exceedingly simple in construction yet efficient and practical in operation.

Briefly described, my invention consists of a body casting which has two ascending inlet passageways merging into a rather large outlet chamber. Seats are formed adjacent the upper ends of the inlet ducts and a single ball freely moves to and from either seat through the outlet chamber. A guard member prevents the ball valve from leaving the outlet chamber upwardly.

One advantage of my check valve lies in its positiveness of operation due to the fact that the ball not only gravitates to its seat but is also forced down upon its seat by pressure of the entrapped fluid. Also, the ball or sphere, when seated, does not interfere with the fluid flow in the adjacent duct.

Another feature of my invention is its simplicity. Very little machine work is required.

Yet another feature is my guard plate for preventing the ball from traveling upwardly out of the outlet chamber. The narrow central portion of the rib or bar allows the ball to pass upwardly until it is in the middle of the outlet chamber. Once in this position, it cannot return to its former seat as fluid pressure prevents such movement.

Other objects and advantages reside in the special construction, combination and arrangement of the various elements forming the invention as more fully hereinafter described and claimed, reference being had to the accompanying drawing forming part hereof, wherein:

Figure 1 is a top view of my invention with the guard plate thereon.

Figure 2 is a side view of Figure 1, parts being broken away in order to expedite the showing.

Figure 3 is a view in cross section taken along the line III—III of Figure 1.

Figure 4 is a cross sectional view, similar to Figure 3, disclosing a modified form of guard plate.

Referring with particularity to the drawing, —10— designates the main body member, —11— the guard plate or member, and —12— the valve or ball.

The main body —10— has an outlet chamber —13—, with two descending ports, —14— and —15— formed therein. Seats —24— and —25—, respectively, are formed near the top ends of these ports and the ball valve —12— may move from one seat to the other along its usual path —C—. See Figure 2.

The descending ports —14— and —15— egress through flanges —34— and —35— respectively. A flange —33— is provided adjacent the outlet chamber and the guard member —11— is held thereon by any suitable means. (Not shown).

Sometimes the ball valve is forced upwardly against the guard member and hence I provide a rib or bar —16—, tapered or narrowed as at —17—, to prevent departure of the ball. The tapered portion —17— allows the ball to continue a slight upward movement but gradually forces it towards the center of the chamber whereby it will be in a central or neutral position. Herefrom, due to fluid pressure and gravity, it will find its proper seat.

Figure 4 shows a guard member —51— with a rib —52— narrowed as at —53—. The circle —AA— represents a ball valve at either side of its central position and circle —BB— shows the same at its central position. Similarly, in Figure 3, —A— shows the ball near one edge of the outlet chamber and —B— discloses its central and higher position. Note that the rib is of the same thickness in the modification whereas the preferred form shows it to be thinner at its central portion.

The operation is readily understood. A pump furnishes fluid to either of the inlets, —14— or —15—, the one not used being connected to an auxiliary pump. The fluid egresses through the chamber —13—. Should the first pump fail to function the auxiliary pump is started and the valve immediately forces the ball valve to the opposite seat. The fluid egresses as before.

Having thus revealed this invention, I claim as new and desire to secure the following combinations and elements, or equivalents thereof, by Letters Patent of the United States.

What I claim is:

1. A valve comprising an integral body casting having an outlet chamber with two descending ports leading therefrom and terminating in the same straight-line, a seat in either port, and a ball adapted to rest in either of said seats, one of said seats being located so that its projection upwardly in parallelism with the axis of its port passes through the outlet chamber without contacting with the walls of said outlet chamber for the purpose described.

2. A device comprising the elements in combination set forth in claim 1 and also having guarding means placed in the outlet chamber juxtaposed to the ports whereby the ball is prevented from leaving the outlet chamber, said guard means including a bar extending across the top opening of the outlet chamber, said bar being of relatively small size near its central portion and gradually increasing in size towards its ends.

3. A valve comprising an integral body casting having an outlet chamber with two descending ports leading therefrom, a seat in either port, and a movable element adapted to rest in either of said seats, one of said seats being located so that its projection upwardly in parallelism with the axis of its port passes through the outlet chamber without contacting with the walls of said outlet chamber for the purpose described.

In testimony whereof I affix my signature.

LELAND J. TOWNE.